US012692132B2

(12) United States Patent
Eliasson

(10) Patent No.: US 12,692,132 B2
(45) Date of Patent: Jul. 28, 2026

(54) MOUNTING ASSEMBLIES FOR OVERHEAD RAIL SYSTEMS AND OVERHEAD RAIL SYSTEMS TO SUPPORT A LIFT UNIT

(71) Applicant: LIKO RESEARCH & DEVELOPMENT AB, Luleå (SE)

(72) Inventor: Therese Eliasson, Luleå (SE)

(73) Assignee: Liko Research & Development AB, Luleå (SE)

( * ) Notice: Subject to any disclaimer, the term of this patent is extended or adjusted under 35 U.S.C. 154(b) by 1032 days.

(21) Appl. No.: 17/839,935

(22) Filed: Jun. 14, 2022

(65) Prior Publication Data

US 2022/0396455 A1 Dec. 15, 2022

Related U.S. Application Data

(60) Provisional application No. 63/210,689, filed on Jun. 15, 2021.

(51) Int. Cl.

| | |
|---|---|
| ***B66C 6/00*** | (2006.01) |
| ***A61G 7/10*** | (2006.01) |
| ***B66C 17/00*** | (2006.01) |

(52) U.S. Cl.

CPC .............. *B66C 6/00* (2013.01); *A61G 7/1042* (2013.01); *B66C 17/00* (2013.01)

(58) Field of Classification Search

CPC .......... B66C 6/00; B66C 17/00; A61G 7/1042

See application file for complete search history.

(56) References Cited

U.S. PATENT DOCUMENTS

| | | | | | |
|---|---|---|---|---|---|
| 4,125,908 | A * | 11/1978 | Vail | A61G 7/1042 | 105/155 |
| 4,202,064 | A * | 5/1980 | Joergensen | B66C 17/00 | 212/312 |
| 4,243,147 | A * | 1/1981 | Twitchell | A61G 7/1042 | 212/327 |
| 5,456,655 | A * | 10/1995 | Morris | A61G 7/1042 | 5/81.1 R |
| 5,511,256 | A * | 4/1996 | Capaldi | A61G 7/1051 | 403/217 |

(Continued)

FOREIGN PATENT DOCUMENTS

EP 2402279 A1 * 1/2012 ........... A61G 7/1042

OTHER PUBLICATIONS

Sculptform Click-on Battens—Installation Guide, https://sculptform.com/click-on-batten-installation, 30 pages.

*Primary Examiner* — Jason C Smith

(74) *Attorney, Agent, or Firm* — Dinsmore & Shohl LLP

(57) ABSTRACT

A mounting assembly for a cross-rail of an overhead rail system includes a mounting rail, an attachment bracket, and a spring-loaded pin. The mounting rail is configured to mount to a sidewall and includes a bracket receiving recess. The attachment bracket includes an attachment portion and an extension portion, wherein the attachment portion is shaped to correspond to the bracket receiving recess such that the attachment portion is positionable within the bracket receiving recess. The spring-loaded pin is coupled to the attachment bracket and includes a retracted position and an extended position, wherein the spring-loaded pin is biased to the extended position to lock the cross-rail to the extension portion of the attachment bracket.

17 Claims, 7 Drawing Sheets

(56) References Cited

U.S. PATENT DOCUMENTS

| | | | | | |
|---|---|---|---|---|---|
| 5,809,591 | A * | 9/1998 | Capaldi | A61G 7/108 | |
| | | | | | 5/89.1 |
| 6,637,712 | B1 * | 10/2003 | Lagerweij | B60N 2/0887 | |
| | | | | | 296/64 |
| 8,528,871 | B2 * | 9/2013 | Begic | A47B 96/067 | |
| | | | | | 248/221.11 |
| 8,978,905 | B2 * | 3/2015 | Bergenstrale et al. | B66D 3/18 | |
| | | | | | 212/324 |
| 9,877,885 | B2 * | 1/2018 | Trepanier | A61G 7/1073 | |
| 9,902,589 | B2 * | 2/2018 | Gregory | B65H 54/585 | |
| 11,013,654 | B2 * | 5/2021 | Wallin | A61G 7/1042 | |
| 11,464,696 | B2 * | 10/2022 | Glukhovsky | A63B 24/0087 | |
| 11,471,349 | B2 * | 10/2022 | Stevens | A61G 7/1042 | |
| 11,602,471 | B2 * | 3/2023 | Dole | A61G 7/1046 | |
| 11,786,430 | B2 * | 10/2023 | Kaikenger | A61G 7/1065 | |
| | | | | | 5/83.1 |
| 2010/0077679 | A1 * | 4/2010 | Sagayama | F24S 25/13 | |
| | | | | | 52/173.3 |
| 2022/0133566 | A1 * | 5/2022 | Monson | A61G 7/1046 | |
| | | | | | 5/83.1 |
| 2022/0396455 | A1 * | 12/2022 | Eliasson | B66C 6/00 | |
| 2025/0160523 | A1 * | 5/2025 | Milberg | A47C 4/021 | |

* cited by examiner

MOUNTING ASSEMBLIES FOR OVERHEAD RAIL SYSTEMS AND OVERHEAD RAIL SYSTEMS TO SUPPORT A LIFT UNIT

CROSS REFERENCE TO RELATED APPLICATION

This application claims the benefit of U.S. Patent Application Ser. No. 63/210,689, filed Jun. 15, 2021, and entitled "MOUNTING ASSEMBLIES FOR OVERHEAD RAIL SYSTEMS AND OVERHEAD RAIL SYSTEMS TO SUPPORT A LIFT UNIT", which is hereby incorporated by reference in its entirety.

TECHNICAL FIELD

The present specification generally relates to mounting assemblies for overhead rail systems and overhead rail systems and, more specifically, mounting assemblies for overhead rail systems and overhead rail systems for supporting a lift unit.

BACKGROUND

Rail mounted lift systems may be used in hospital and/or care settings to transport, elevate, and/or adjust a position of a subject (e.g., a person or animal). The rails of the rail-mounted lift system may be mounted to a ceiling of the facility. However, in some environments it may be impossible or impractical to mount the rail to the ceiling.

Accordingly, a need exists for overhead rail systems which provide improved mounting alternatives to ceiling-mounted rails.

SUMMARY

Embodiments of the present disclosure address the above deficiencies of conventional, ceiling-mounted rails by providing wall-mounted overhead rail assemblies, as will be described in greater detail below.

In a first aspect A1, a mounting assembly for a cross-rail of an overhead rail system includes a mounting rail, an attachment bracket, and a spring-loaded pin. The mounting rail is configured to mount to a sidewall and includes a bracket receiving recess. The attachment bracket includes an attachment portion and an extension portion, wherein the attachment portion is shaped to correspond to the bracket receiving recess such that the attachment portion is positionable within the bracket receiving recess. The spring-loaded pin is coupled to the attachment bracket and includes a retracted position and an extended position, wherein the spring-loaded pin is biased to the extended position to lock the cross-rail to the extension portion of the attachment bracket.

In a second aspect A2 according to first aspect A1, wherein the mounting rail includes a mounting base configured to be engaged with and fixed to the sidewall via one or more fasteners, a first retention flange extending from a first horizontal edge of the mounting base, and a second retention flange extending from a second horizontal edge of the mounting base, wherein the bracket receiving recess is partially enclosed by the mounting base, the first retention flange, and the second retention flange.

In a third aspect A3 according to any preceding aspect, wherein the attachment bracket includes a body defining an interior chamber and one or more openings extending through the body to the interior chamber, and the spring-loaded pin is positioned within the interior chamber and a portion of the spring-loaded pin is extendable and retractable through the one or more openings.

In a fourth aspect A4 according to any preceding aspect, wherein the spring-loaded pin includes a first pin member extending in a first direction, a second pin member extending in a second, opposite direction, and a spring member coupling the first pin member to the second pin member.

In a fifth aspect A5 according to any preceding aspect, wherein the attachment bracket includes a body, an interior chamber positioned within the body, a first opening extending through the body to the interior chamber, wherein the first pin member is slidably positioned within the first opening, and a second opening extending through the body to the interior chamber, wherein the second pin member is slidably positioned within the second opening.

In a sixth aspect A6 according to any preceding aspect, wherein the first opening is positioned on a first side of the body and the second opening is positioned on a second, opposite side of the body.

In a seventh aspect A7 according to any preceding aspect, wherein the attachment bracket is longitudinally slidable within the bracket receiving recess of the mounting rail.

In an eighth aspect A8, a mounting assembly for a cross-rail of an overhead rail system includes a mounting rail, an attachment bracket, and a spring-loaded pin. The mounting rail is configured to mount to a sidewall and includes a bracket receiving recess having retention flanges extending toward one another. The attachment bracket includes an attachment portion and an extension portion, wherein the attachment portion is shaped to correspond to the bracket receiving recess of the mounting rail such that the attachment portion is positionable within the bracket receiving recess and the extension portion extends through a slot between the retention flanges. The spring-loaded pin is coupled to the attachment bracket and includes a retracted position and an extended position, wherein the spring-loaded pin is biased to the extended position to lock the cross-rail to the extension portion of the attachment bracket.

In a ninth aspect A9 according to any preceding aspect, wherein the mounting rail includes a mounting base configured to be engaged with and fixed to the sidewall via one or more fasteners, and the retention flanges include a first retention flange extending from a first horizontal edge of the mounting base at a first oblique angle relative to the mounting base and defining a first retention surface, and a second retention flange extending from a second horizontal edge of the mounting base at a second oblique angle relative to the mounting base and defining a second retention surface.

In a tenth aspect A10 according to any preceding aspect, wherein the attachment bracket includes a body defining an interior chamber and one or more openings extending through the body to the interior chamber, and the spring-loaded pin is positioned within the interior chamber and a portion of the spring-loaded pin is extendable and retractable through the one or more openings.

In an eleventh aspect A11 according to any preceding aspect, wherein the spring-loaded pin includes a first pin member extending in a first direction, a second pin member extending in a second, opposite direction, and a spring member coupling the first pin member to the second pin member.

In a twelfth aspect A12 according to any preceding aspect, wherein the attachment bracket includes a body, an interior chamber positioned within the body, a first opening extending through the body to the interior chamber, wherein the first pin member is slidably positioned within the first opening, and a second opening extending through the body to the interior chamber, wherein the second pin member is slidably positioned within the second opening.

In a thirteenth aspect A13 according to any preceding aspect, wherein the first opening is positioned on a first side of the body and the second opening is positioned on a second, opposite side of the body.

In a fourteenth aspect A14 according to any preceding aspect, wherein the attachment bracket is longitudinally slidable within the bracket receiving recess of the mounting rail.

In a fifteenth aspect 15, an overhead rail system includes a first mounting assembly configured to be coupled to a first sidewall, a second mounting assembly configured to be coupled to a second sidewall, and a cross-rail. Each of the mounting assemblies includes a mounting rail, an attachment bracket, and a spring loaded pin. The mounting rail is configured to be mounted to a sidewall and includes a bracket receiving recess. The attachment bracket includes an attachment portion and an extension portion, wherein the attachment portion is positioned within the bracket receiving recess. The spring-loaded pin is coupled to the attachment bracket and includes a retracted position and an extended position, wherein the spring-loaded pin is biased to the extended position. The cross-rail is configured to support a lift unit thereon and includes a first support end removably coupled to the attachment bracket of the first mounting assembly via the spring-loaded pin of the first mounting assembly and a second support end removably coupled to the attachment bracket of the second mounting assembly via the spring-loaded pin of the second mounting assembly.

In a sixteenth aspect A16 according to any preceding aspect, wherein the first and second support ends of the cross-rail include a top surface, a bottom surface opposite the top surface, a mounting recess extending through the bottom surface toward and spaced from the top surface, such that the top surface overlies the extension portion of the attachment bracket when positioned thereon.

In a seventeenth aspect A17 according to any preceding aspect, wherein the cross-rail includes first and second side surfaces extending between the top surface and the bottom surface, wherein at least one of the first and second side surfaces includes a pin aperture for receiving the spring-loaded pin.

In an eighteenth aspect A18 according to any preceding aspect, wherein the mounting rail of each of the first mounting assembly and the second mounting assembly includes retention flanges extending toward one another.

In a nineteenth aspect A19 according to any preceding aspect, wherein the attachment portion of the attachment bracket of the first and second mounting assemblies is positioned within the bracket receiving recess and engages the retention flanges, and the extension portion extends through a slot between the retention flanges.

In a twentieth aspect A20 according to any preceding aspect, wherein each attachment bracket includes a body defining an interior chamber and one or more openings extending through the body to the interior chamber, and each spring-loaded pin is positioned within the interior chamber and a portion of the spring-loaded pin is extendable and retractable through the one or more openings.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Rail-mounted lift systems are useful in transporting, elevating, and/or otherwise adjusting a position of a subject (e.g., a person, animal, or the like). Rail-mounted lift systems may be mounted to an overhead rail, which, in turn, is mounted to the ceiling either directly or through pendants which suspend the rail from the ceiling. However, care facilities and/or homes may not have a ceiling suitable to support a rail mounted thereto. For example, the ceiling may not provide sufficient structural support or the ceiling may be uneven, making it difficult, costly, and/or tedious to mount a rail capable of supporting a lift unit to the ceiling. Embodiments of the present disclosure are directed to addressing the above limitations by providing an overhead rail system which is mountable to the sidewalls of the room (as opposed to the ceiling) such that no portion of the overhead lift system need be attached to the ceiling. For example, embodiments of the present disclosure may include mounting assemblies which include a mounting rail, an attachment bracket, and a spring-loaded pin. The mounting assemblies may be used to affix a cross-rail to the sidewalls of a room such that the cross-rail extends across the room. Specifically, the mounting rail may be mounted to a sidewall of a room instead of the ceiling. The mounting rail includes a bracket receiving recess. The attachment bracket includes an attachment portion and an extension portion, wherein the attachment portion is shaped to correspond to the bracket receiving recess such that the attachment portion is positionable within the bracket receiving recess The spring-loaded pin may be coupled to the attachment bracket and includes a retracted position and an extended position, wherein the spring-loaded pin is biased to the extended position to lock the cross-rail to the extension portion of the attachment bracket. Accordingly, the overhead rail system may be mounted to the sidewall of a room without need for ceiling supports. Additionally, the cross-rail may be mounted in place without need of additional tools (e.g., such as screw drivers, wrenches, etc.) thereby simplifying installation. Additional features and embodiments will be described in greater detail herein.

As used herein, directional language such as "top," "bottom," "side," "above," "below," or the like, is used for convenience of description in light of the depicted coordinate axes and/or orientation of the figures and is not intended to limit the scope of the present disclosure.

Figure 1:
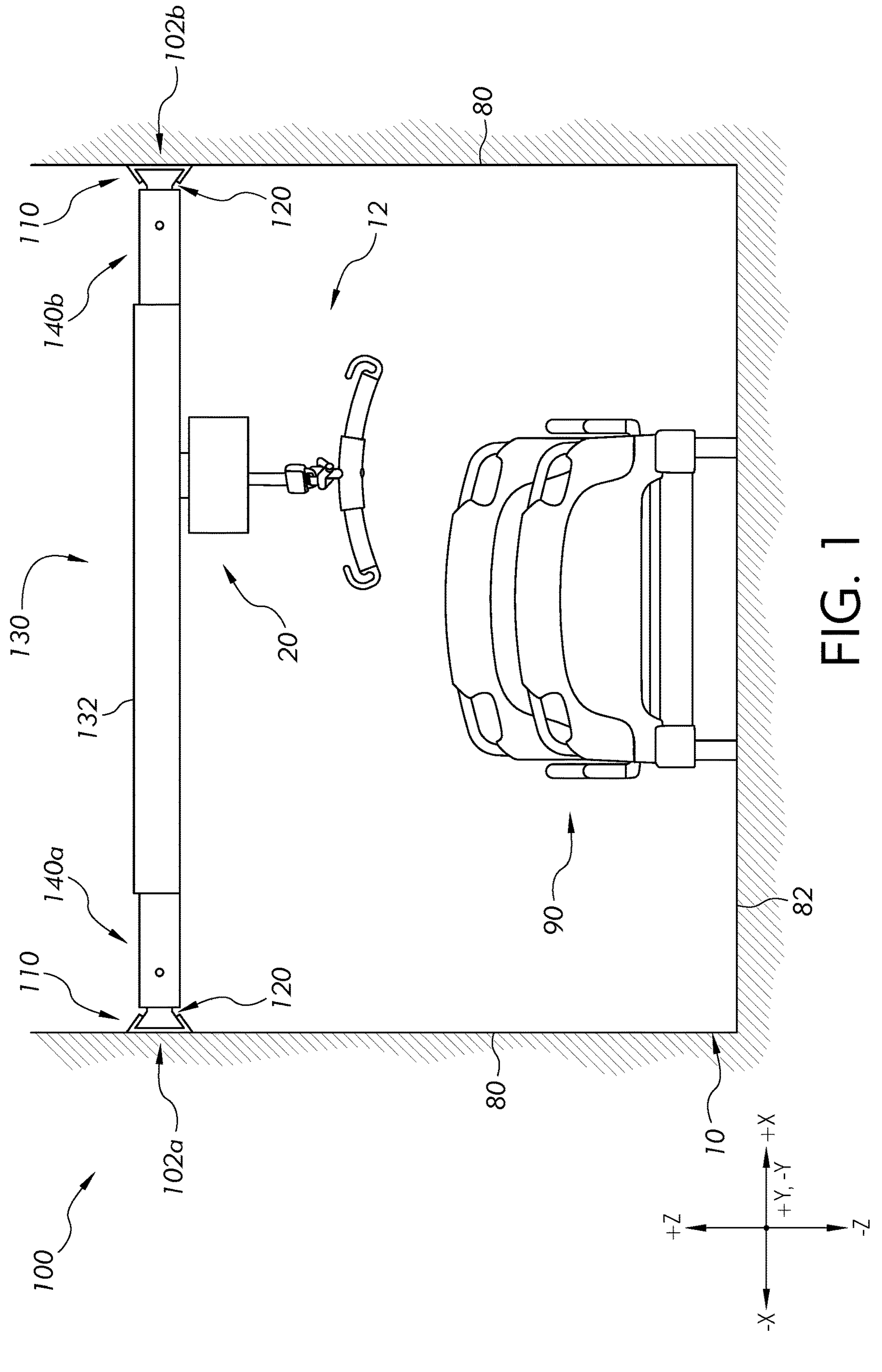
FIG. 1 schematically depicts an overhead rail system for supporting a lift unit thereon, according to one or more embodiments shown and described herein.

Referring now to FIG. 1, a room 10 (e.g., within a care facility, hospital, home, or the like) is generally depicted. The room 10 may include opposing sidewalls 80 (also referred to as first and second sidewalls), a floor 82, and a ceiling (not shown). The room 10 may further include additional walls and/or surfaces without departing from the scope of the present disclosure. Within the room 10 may be furniture 90 such as a bed, chair, or the like. It may be desirable to move and/or reposition a subject (e.g., a patient, person, or other subject) within the room 10, and/or reposition the subject on the furniture 90. To assist in movement and/or repositioning of the subject, an overhead lift system 12 may be included. For example, the overhead lift system 12 may include a lift unit 20 and an overhead rail system 100 with which the lift unit 20 may be engaged. The lift unit 20 may be used to raise, lower, move, turn, transport, etc. a subject which may be attached to the lift unit 20 with a sling (not shown) or other subject engagement device.

Figure 2:
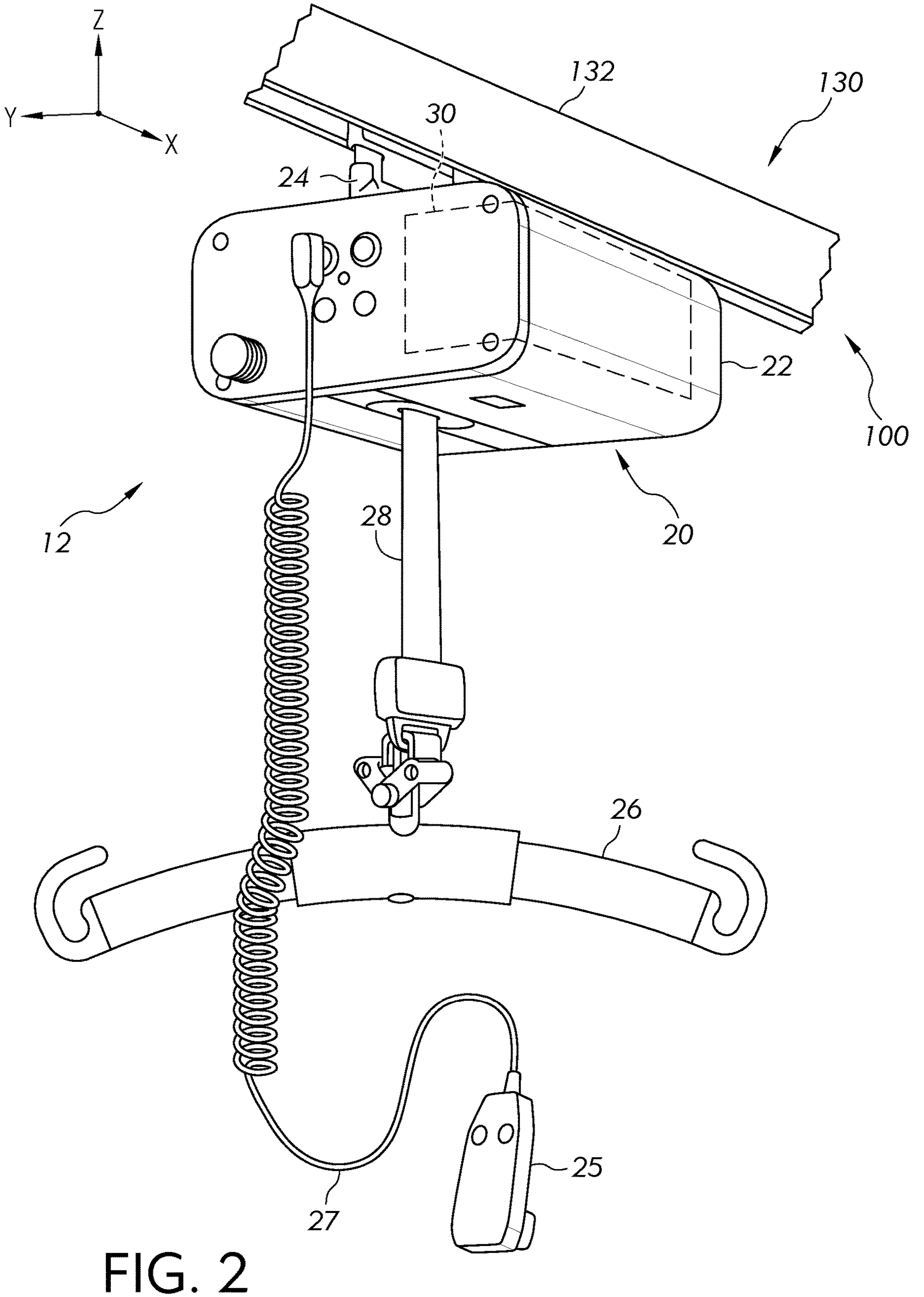
FIG. 2 schematically depicts a lift unit, according to one or more embodiments shown and described herein.

Referring to FIG. 2, an exemplary lift unit 20 is schematically depicted. As will be described in greater detail herein, the lift unit 20 is configured to be slidably engaged with and travel along the overhead rail system 100 to transport a subject coupled to the lift unit 20. The lift unit 20 may generally include a lift housing 22 that forms an outer enclosure around the various components (e.g., the lift motor 30, internal controls, wires, gearing, etc.) of the lift unit 20 and a lift carriage 24 coupled to the lift housing 22. The lift carriage 24 engages at least a cross-rail 130 (as will be described in greater detail herein) of the overhead rail system 100 such that the lift unit 20 is suspended from the overhead rail system 100.

Still referring to FIG. 2, the lift unit 20 may include a lift strap 28 that may be taken-up or paid-out from the lift unit 20, such as from the lift housing 22. For example, a lift motor 30 positioned within the lift housing 22 may be operably coupled to the lift strap 28 to controllably take-up or pay-out the lift strap 28. A subject may be attached to the lift strap 28 via a sling bar 26 or a similar accessory attached to the lift strap 28. More specifically, the sling bar 26 or a similar accessory may be attached to a harness or sling in which the subject is positioned, thereby facilitating a lifting operation, a lowering operation, a transporting operation, a supporting operation, or the like.

Still referring to FIG. 2, the lift unit 20 may further include a hand control device 25 for operating the lift unit 20. For example, the hand control device 25 may include any number and/or type of user interface devices (e.g., toggles, buttons, switches, touchscreens, or the like) to allow a user to operate the lift unit 20. For example, the hand control device 25 may be communicatively coupled to the lift motor 30 via a wired connection 27, as illustrated in FIG. 2, or wireless connection (e.g., via Bluetooth, WiFi, cellular network, or the like). Accordingly, using the hand control device 25, a user may provide inputs to the lift unit 20 to cause the lift motor 30 to take-up the lift strap 28, pay-out the lift strap 28, and/or move the lift unit 20 along the overhead rail system 100.

Figure 3:
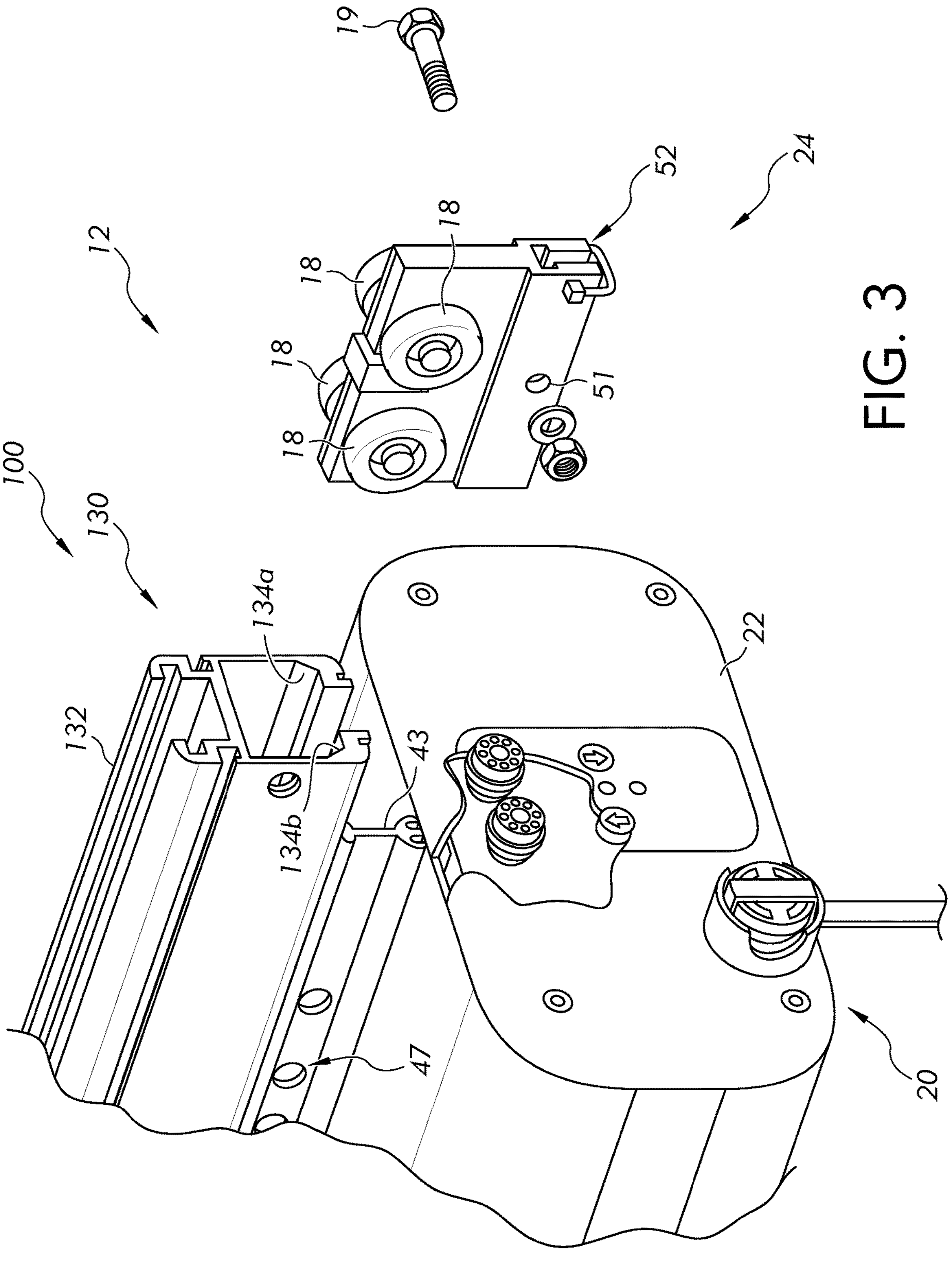
FIG. 3 schematically depicts a partially exploded view of a carriage of the lift unit of FIG. 2 and a cross-rail of the overhead rail system, according to one or more embodiments shown and described herein.

Referring to FIG. 3, the lift carriage 24 engages at least a cross-rail 130 (as will be described in greater detail herein) of the overhead rail system 100 such that the lift unit 20 is suspended from the overhead rail system 100. In embodiments, the lift carriage 24 also facilitates translation of the lift unit 20 along the cross-rail 130 with support wheels 18 rotatably affixed to the lift carriage 24. It is noted that a greater or fewer number of support wheels 18 may be included without departing from the scope of the present disclosure. In some embodiments, the support wheels 18 of the lift carriage 24 may be motorized such that the support wheels 18 may be selectively rotated to translate the attached lift unit 20 along the cross-rail 130 of the overhead rail system 100. In other embodiments, the lift unit 20 may be moved along the cross-rail 130 by manually pulling the lift unit 20 along the cross-rail 130 by, for example, a tether, a leash, the lift strap 28, a sling attached to the lift unit 20, or the like. In other embodiments, it is contemplated the lift unit 20 may be stationary instead of longitudinally moveable along the cross-rail 130.

Still referring to FIG. 3, the lift housing 22 may be mechanically coupled to the lift carriage 24. For example, in some embodiments, the lift unit 20 includes a connection rail 43 mounted to a top surface of the lift housing 22. The connection rail 43 facilitates connecting and securing the lift unit 20 to the lift carriage 24. In the embodiment of the lift unit 20 shown in FIG. 3, the connection rail 43 has a T-shaped configuration and the lift carriage 24 has a receiving slot 52 with a complimentary configuration for receiving the connection rail 43. The lift carriage 24 may be secured to the connection rail 43 with a fastener 19, such as a bolt and nut as depicted in FIG. 3, which extends transversely through an opening 51 in the lift carriage 24 and a corresponding opening 47 in the connection rail 43.

Referring again to FIG. 1, the overhead rail system 100 is schematically depicted. As illustrated the overhead rail system 100 may include a first mounting assembly **102*a* and a second mounting assembly 102*b*. It is noted that the first mounting assembly 102*a* and the second mounting assembly 102*b* may be substantially identical to one another though mounted to opposing sidewalls 80 of the room 10. For example, the first mounting assembly 102*a* may be mounted to a first sidewall and the second mounting assembly 102*b* may be mounted to a second sidewall positioned opposite the first sidewall. Due to the first mounting assembly 102*a* and the second mounting assembly 102*b* being substantially identical in one or more embodiments, description of a mounting assembly may apply to the first mounting assembly 102*a*, the second mounting assembly 102*b*, or both. However, it is contemplated that in some embodiments, the first mounting assembly 102*a* and the second mounting assembly 102*b*** may have more, less, or different features, without departing from the scope of the present disclosure.

In the depicted embodiment, each mounting assembly **102*a*, 102*b* includes a mounting rail 110 and an attachment bracket 120. The overhead rail system 100 further includes a cross-rail 130 extending between and coupled to each mounting assembly 102***a*, 102*b*. It is noted that the various components of the overhead rail system 100, such as the cross-rail 130, mounting rails 110, and attachment brackets 120, may be formed from any combination of metal, metal alloys, plastics, or the like having sufficient strength to support a lift unit 20 and subject supported thereon.

As noted above, each mounting assembly 102*a*, 102*b* may include a mounting rail 110. The mounting rail 110 may be adapted to receive the attachment bracket 120. For example, and with reference to FIG. 4, a mounting rail 110 is shown in isolation. The mounting rail 110 may generally include a mounting base 114 configured to be engaged with and affixed to the sidewall 80, such as depicted in FIG. 1, via, for example, one or more fasteners 115. For example, the mounting base 114 may include one or more fastener holes 111 formed therein which allow fasteners 115 to be passed through to secure the mounting rail 110 to a sidewall 80, such as depicted in FIG. 1. In some embodiments, the mounting base 114 includes a planar surface, which engages the sidewall 80 in a face-to-face configuration.

Figure 4:
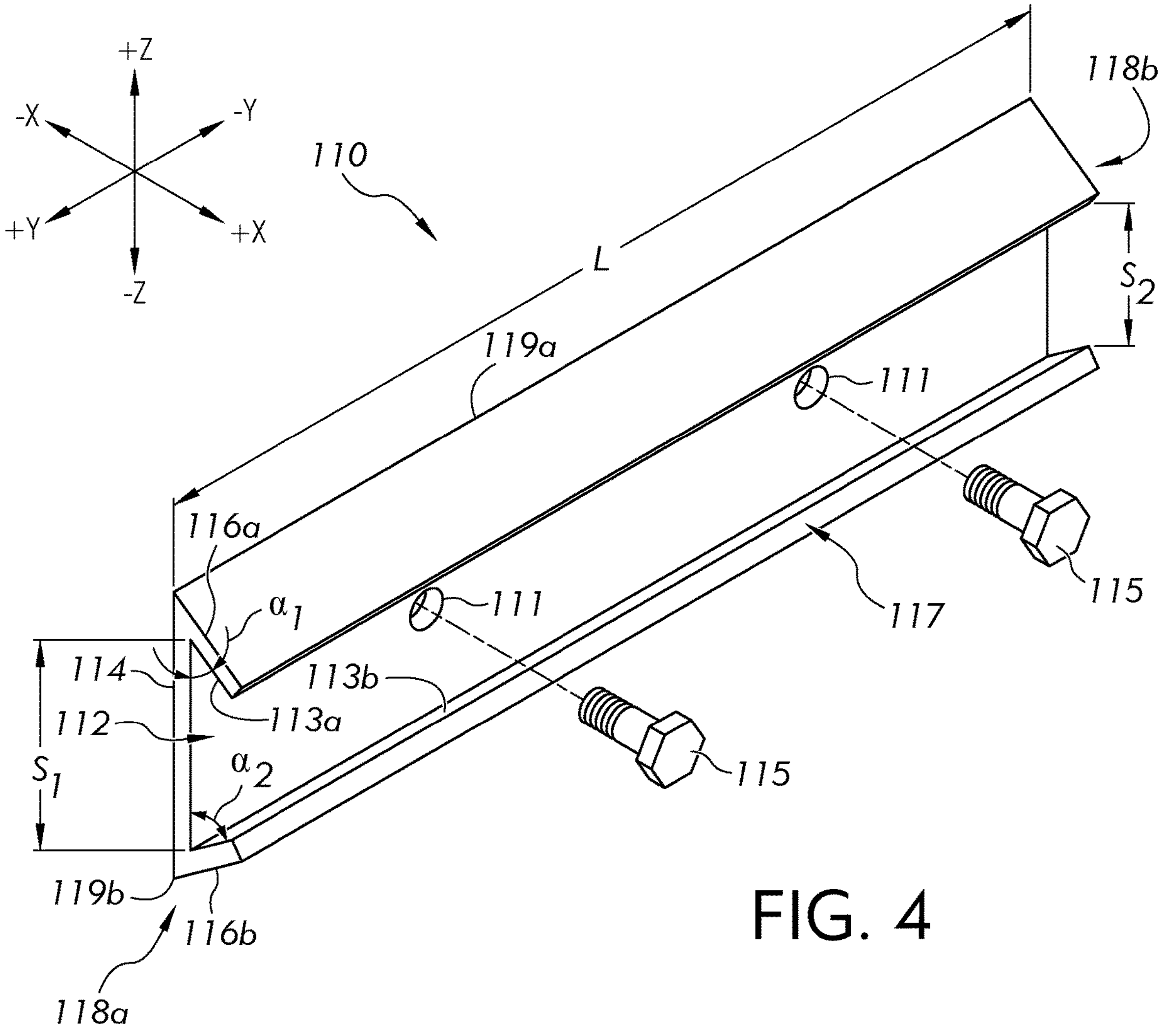
FIG. 4 schematically depicts a mounting rail of the overhead rail system of FIG. 1 in isolation, according to one or more embodiments shown and described herein.

Still referring to FIG. 4, the mounting rail 110 generally defines a bracket receiving recess 112 formed therein and extending along a length L (such as a portion of the length L) of the mounting rail 110. The bracket receiving recess 112 may be shaped to retain the attachment bracket 120 therein, and to prevent lateral motion of the attachment bracket 120 in the +X direction of the depicted coordinate axes that may dislodge the attachment bracket 120 from the bracket receiving recess 112. For example, in some embodiments, the mounting rail 110 may include a first retention flange 116*a* and a second retention flange 116*b*, respectfully. The first and second retention flanges 116*a*, 116*b* may extend from the mounting base 114 and together, with the mounting base 114, define a shape or profile of the bracket receiving recess 112. For example, the profile of the bracket receiving recess 112 may be any polygonal or non-polygonal shape. For example, the profile based on the relative orientation of the first retention flange 116*a*, the second retention flange 116*b* and the planar wall-mounting substrate 114 may be dovetail-shaped, as depicted, C-shaped, circular, rectangular, square, etc.

In the depicted embodiment, the first retention flange 116*a* may extend from a first horizontal edge 119*a* (e.g., extending substantially parallel to the Y-axis of the depicted coordinate axes) of the mounting base 114. The first retention flange 116*a* may extend at a first oblique angle, $\alpha_1$, relative to the mounting base 114 and define a first retention surface 113*a*. Similarly, the second retention flange 116*b* may extend from a second horizontal edge 119*b* of the planar wall-mounting surface (e.g., extending substantially parallel to the Y-axis of the depicted coordinate axes), opposite from the first horizontal edge 119*a*. The second retention flange 116*b* may extend at a second oblique angle, $\alpha_2$, relative to the mounting base 114 and define a second retention surface 113*b*. Accordingly, in this embodiment, a cross-sectional height of the bracket receiving recess 112 may converge from a first spacing $s_1$ (in the Z direction of the depicted coordinate axes) at the mounting base 114 to a second spacing $s_2$, which is less than the first spacing $s_1$. The first and second oblique angles $\alpha_1$, $\alpha_2$, may be the same or different from one another. For example, each of the first and second oblique angles $\alpha_1$, $\alpha_2$, may be between about 30° and about 70°, such as about 45°, from the retention surfaces 113*a*, 113*b* to the mounting base 114, though greater or smaller angles are contemplated and possible. The first and second retention flanges 116*a*, 116*b* may be integral with the mounting base 114 or coupled thereto through any joining technique (e.g., welding, brazing, fastening, or the like).

It is noted that while the retention surfaces 113*a*, 113*b* are illustrated as being generally planar, the retention surfaces 113*a*, 113*b* may include a variety of profiles. For example, the retention surfaces 113*a*, 113*b* may be curved, c-shaped, L-shaped, or the like.

The mounting rail 110 may be open ended at a first end 118*a*, a second end 118*b*, or both such that the attachment bracket 120 may be positioned within the bracket receiving recess 112 from either the first end 118*a*, the second end 118*b*, or both. It is contemplated that in some embodiments, access inlets may be formed anywhere along the length L, of the mounting rail 110 to allow the attachment bracket 120 to be positioned within the bracket receiving recess 112.

Figure 5:
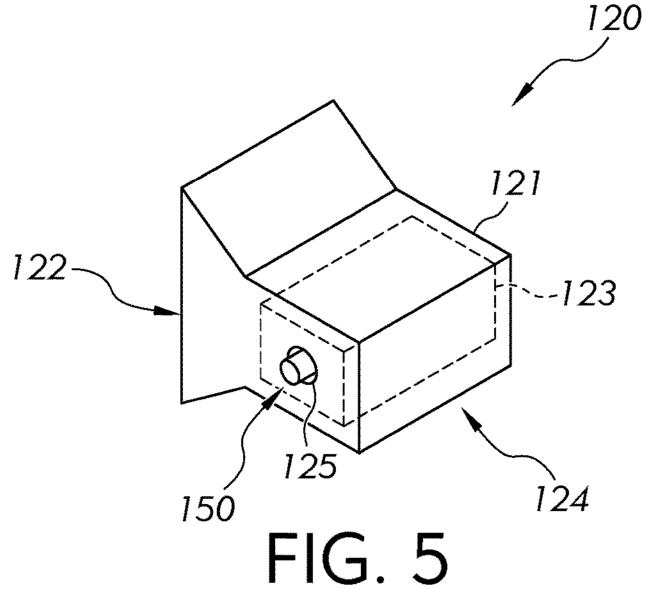
FIG. 5 schematically depicts an attachment bracket of the overhead rail system of FIG. 1 in isolation, according to one or more embodiments shown and described herein.
Figure 9:
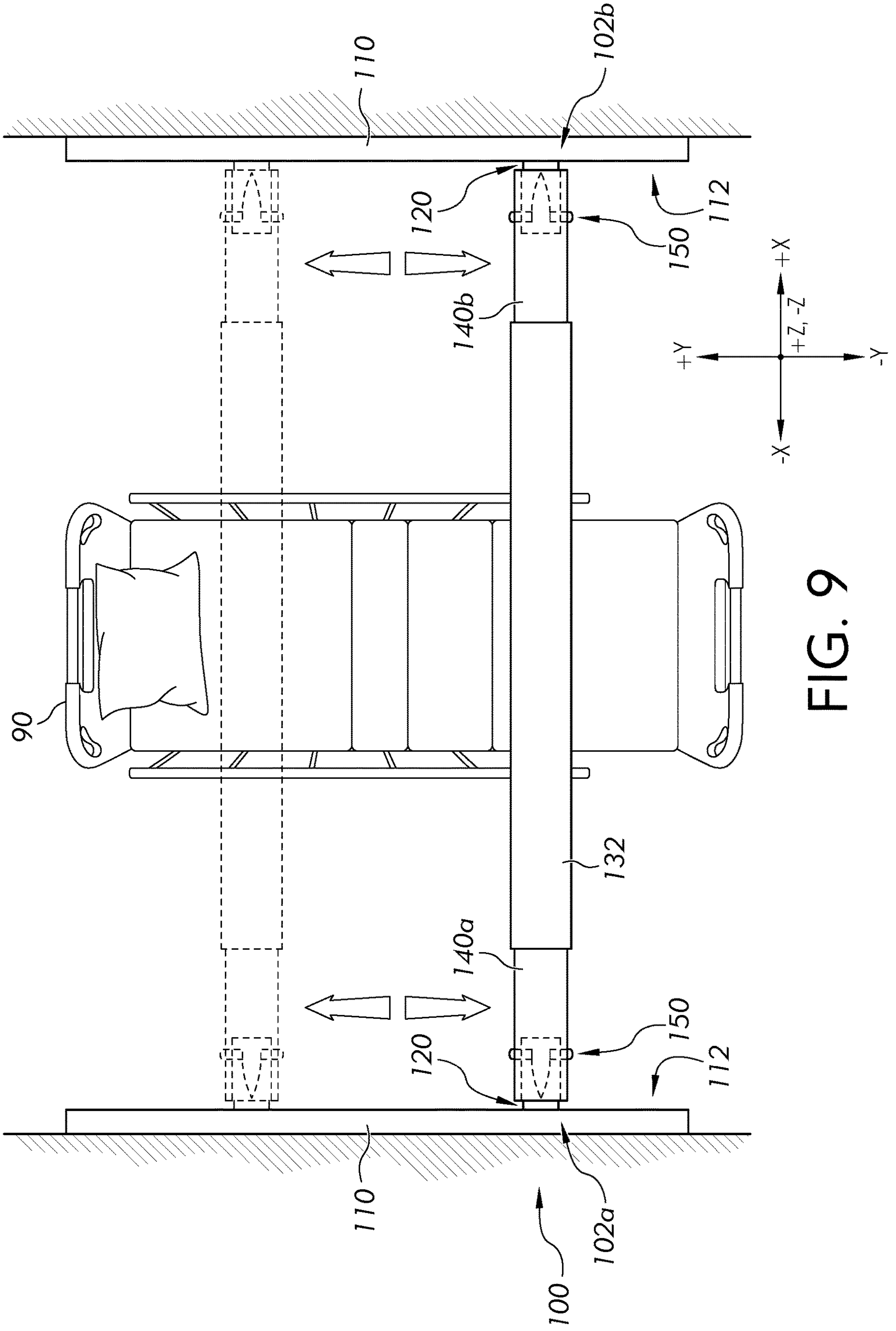
FIG. 9 schematically depicts the overhead lift assembly of FIG. 1 moving from a first position to a second position, according to one or more embodiments shown and described herein.

Referring now to FIG. 5, an attachment bracket 120 is schematically depicted in isolation. The attachment bracket 120 is positionable within the bracket receiving recess 112 of the mounting rail 110. In embodiments, the attachment bracket 120 is longitudinally slidable along the bracket receiving recess 112 (e.g., in the +/− Y direction of the depicted coordinate axes, such as depicted in FIG. 9). That is, the attachment bracket 120 may be able to slide along a longitudinal length (e.g., in the Y-direction of the depicted coordinate axes) of the mounting rail 110 to position the attachment bracket 120 at a desired longitudinal position within the mounting rail 110. Still referring to FIG. 5, the attachment bracket 120 may have a body 121 having an attachment portion 122 and an extension portion 124 extending from the attachment portion 122. The attachment portion 122 and the extension portion 124 may be integral with one another to provide an integral body, or may be coupled to one another through any combination of coupling techniques (e.g., welding, brazing, fastening, or the like).

The attachment portion 122 may be shaped to correspond to the bracket receiving recess 112 of the mounting rail 110 such that the attachment portion 122 is positionable within the bracket receiving recess 112, thereby allowing the attachment portion 122 to be positioned along the mounting rail 110 at a desired position. For example, in embodiments where the bracket receiving recess 112 has the shape of a dovetail slot, as described herein, the attachment portion 122 may have a dovetail shape to correspond to the bracket receiving recess 112. In this example the attachment portion 122 engages the retention surfaces 113*a*, 113*b* of the mounting rail 110, and is thereby retained within the bracket receiving recess 112. In embodiments, the attachment portion 122 may be shaped such that when the attachment portion 122 is positioned within the bracket receiving recess 112, the extension portion 124 extends through a slot 117 between the retention surfaces 113*a*, 113*b* and is sized such that is the attachment portion 122 is unable to advance or otherwise fit through the slot 117 between the retention surfaces 113*a*, 113*b*.

Still referring to FIG. 5, the attachment bracket 120 may include a spring-loaded pin 150 coupled to the attachment bracket 120. The spring-loaded pin 150 may have a retracted position and an extended position (depicted in FIG. 5) wherein the spring-loaded pin 150 is biased (e.g., spring biased) to the extended position. When the spring-loaded pin 150 is in the extended position, the spring-loaded pin 150 may be utilized to lock the cross-rail 130 to the extension portion 124 of the attachment bracket 120, as will be described in greater detail herein. For example, in embodiments, the extension portion 124 may include a body 121 defining an interior chamber 123. The body 121 may also include openings 125 extending through the body 121 to the interior chamber 123. The spring-loaded pin 150 may be positioned within the interior of the chamber 123 and a portion of the spring-loaded pin 150 may extend through and/or retract into the openings 125. Additional embodiments and/or features of the spring-loaded pin 150 will be described in greater detail herein with reference FIGS. 8A and 8B. Moreover, while a single spring-loaded pin 150 is depicted in FIG. 5, it should be understood that other embodiments are contemplated and possible, such as embodiments in which the attachment bracket 120 includes a pair of spring-loaded pins 150 on opposite sides of attachment bracket 120.

Referring again to FIG. 1, extending between the first mounting assembly 102*a* and the second mounting assembly 102*b* is the cross-rail 130, which may be removably coupled to the mounting rails 110 via the attachment brackets 120 of each mounting assembly 102*a*, 102*b*, as will be described in greater detail below. The cross-rail 130 may generally be any rail shaped and sized to support a lift unit 20 thereon. For example, the cross-rail 130 may configured to support translational motion of the lift carriage 24 across the cross-rail 130 in the X-direction of the depicted coordinate axes. In embodiments, the cross-rail 130 may include a first support end 140*a*, a second support end 140*b* opposite the first support end 140*a*, and a lift unit support portion 132 extending between the first support end 140*a* and the second support end 140*b*. It is noted that the first support end 140*a* and the second support end 140*b* may be substantially identical to one another. However, in other embodiments, the first support end 140*a* and the second support end 140*b* may have different features from one another.

Figure 6:
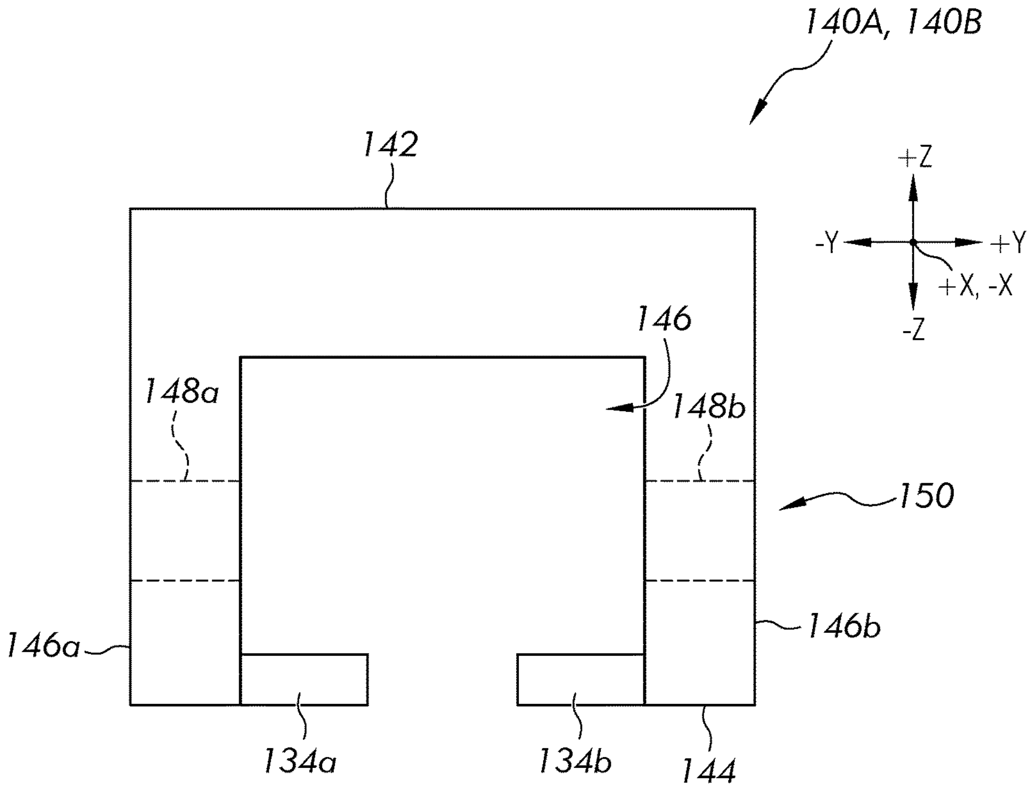
FIG. 6 schematically depicts a support end of a cross-rail of the overhead rail system of FIG. 1, according to one or more embodiments shown and described herein.

Referring now to FIG. 6, a support end 140 (e.g., either the first support end 140*a* or the second support end 140*b*) is depicted in isolation. Each support end 140*a*, 140*b* may include a top surface 142, a bottom surface 144 opposite the top surface 142, and a mounting recess 146 extending through the bottom surface 144 toward and spaced from the top surface 142. As will be described in greater detail below, the mounting recess 146 may be sized and shaped to receive the extension portion 124 of the attachment bracket 120 to mount the attachment bracket 120 thereto.

The support ends 140*a*, 140*b* may further include first and second side surfaces 146*a*, 146*b* extending between the top surface 142 and the bottom surface 144. In some embodiments, at least one of the first and second side surfaces 146*a*, 146*b* includes a pin aperture 148*a*, 148*b* extending through the first and/or second side surface 146*a*, 146*b* to the mounting recess 146. For example, both the first side surface 146*a* and the second side surface 146*b* may have a pin aperture 148*a*, 148*b* formed therein. As will be described in greater detail below, the pin aperture 148*a*, 148*b* may receive the spring-loaded pin 150 of the attachment bracket 120 to secure the attachment bracket 120 to the support end 140*a*, 140*b* positioned thereon.

Referring again to FIG. 1, as noted above, extending between the first support end 140*a* and the second support end 140*b* be may be the lift unit support portion 132, which may be configured to support translation of the lift unit 20 there along. For example, as depicted in FIG. 3, the lift unit support portion 132 may generally have first flange 134*a* and a second flange 134*b* upon which the lift unit 20 may be supported. For example, the support wheels 18 of the lift unit 20, may sit on the first flange 134*a* and/or the second flange 134*b* and translate there along. In embodiments, the first flange 134*a* and the second flange 134*b* extend along an entire length of the lift unit support portion 132, or only a portion thereof. It is noted that in embodiments, such as depicted in FIG. 6, the first flange 134*a* and the second flange 134*b* may not extend into the first support end 140*a* and/or the second support end 140*b*. In other embodiments, is it contemplated the first flange 134*a* and/or the second flange 134*b* may extend along at least a portion of the first support end 140*a* and/or the second support end 140*b*.

Figure 7:
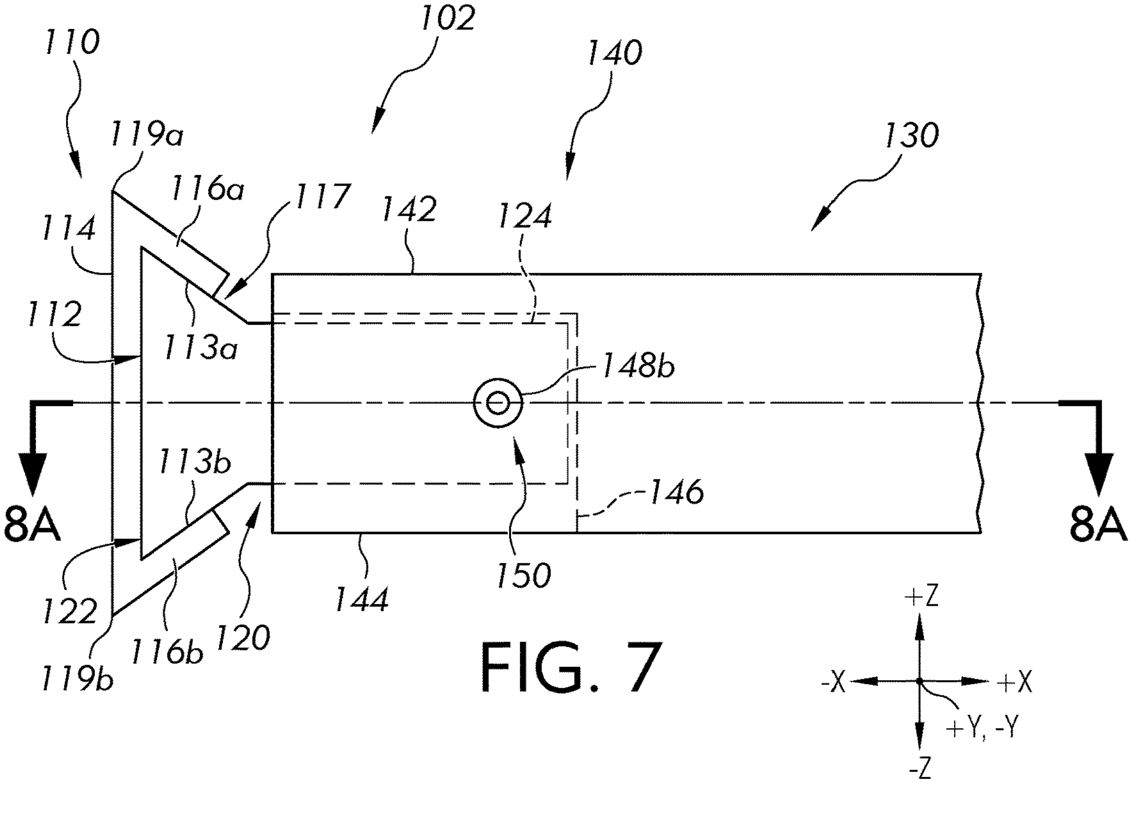
FIG. 7 schematically depicts a side view of one end of an overhead rail system of the preceding figures including the mounting rail, the attachment bracket, and the cross-rail, according to one or more embodiments shown and described herein.

As illustrated in FIG. 1, both the first support end 140*a* and the second support end 140*b* of the cross-rail 130 may be coupled to a mounting rail 110 via an attachment bracket 120. FIG. 7 depicts a more detailed view of a mounting assembly 102, such as the first mounting assembly 102*a* or the second mounting assembly 102*b*, mounted to a support end 140 of the cross-rail 130, such as the first support end 140*a* or the second support end 140*b*, of the cross-rail 130.

When assembled to the mounting rail 110, as illustrated in FIG. 7, the attachment portion 122 of the attachment bracket 120 is positioned with the bracket receiving recess 112 and, in embodiments, engages the retention surfaces 113*a*, 113*b*. The extension portion 124 may extend through the slot 117 between the retention surfaces 113*a*, 113*b* to be engaged with the cross-rail 130. Accordingly, when assembled to the cross-rail 130, the extension portion 124 may be received by the mounting recess 146 of the support end 140 of the cross-rail 130 such that the top surface 142 of the support end 140 overlies the extension portion 124 of the attachment bracket 120 in the +Z direction of the depicted coordinate axes.

Figure 8A:
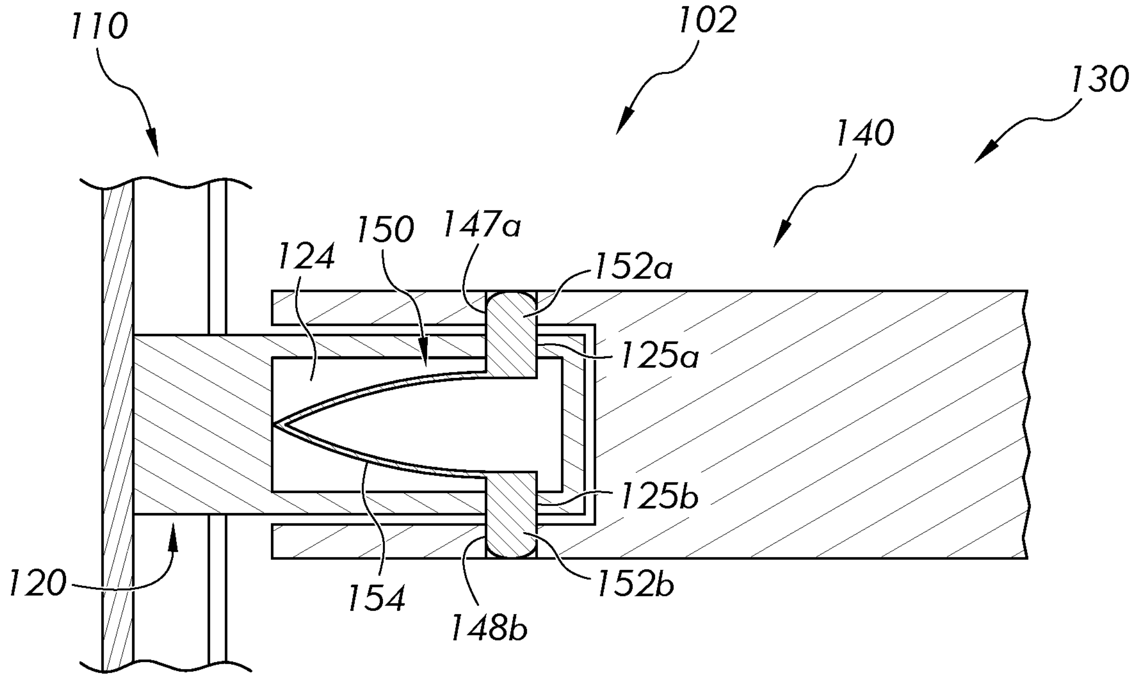
FIG. 8A schematically depicts a cross-sectional view of the overhead rail system of FIG. 7 taken along line 8A-8A, according to one or more embodiments shown and described herein.

FIG. 8A depicts a cross-section along line 8A-8A of FIG. 7. In the depicted embodiment, the spring-loaded pin 150 positioned within the interior chamber 123 is schematically depicted. As noted above, a portion of the spring-loaded pin 150 is extendable and retractable through the one or more openings 125. For example, in some embodiments, the spring-loaded pin 150 may include a first pin member 152*a* extending in a first direction (e.g., the −Y direction of the depicted coordinate axes) and a second pin member 152*b* extending in a second, opposite direction (e.g., the +Y direction of the depicted coordinate axes). A spring member 154 (e.g., one or more leaf springs, torsional spring, or the like) may couple (e.g., via welding, brazing or the like) each of the first pin member 152*a* and the second pin member 152*b* and may bias the first pin member 152*a* and the second pin member 152*b* member in opposing directions such that the first pin member 152*a* and the second pin member 152*b* are biased to extended positions. In some embodiments, a portion of the spring member 154 may be coupled to the body 121 of the attachment bracket 120 within the interior chamber 123 (e.g., via brazing, welding, adhesive, fasteners, or the like).

In the illustrated embodiment, the openings 125 of the attachment portion 122 include a first opening 125*a* positioned on a first side of the body 121 and a second opening 125*b* positioned on a second, opposite side of the body 121. In the depicted embodiments of FIGS. 8A and 8B, the first opening 125*a* extends through the body 121 to the interior chamber 123 and the first pin member 152*a* is slidably positioned within the first opening 125*a*. Similarly, the second opening 125*b* may extend through the body 121 to the interior chamber 123, and the second pin member 152*b* may be slidably positioned within the second opening 125*b*. However, it should be understood that other orientations are contemplated and possible. For example, in some embodiments, openings and/or pin members may extend through adjacent surfaces as opposed to opposite surfaces, or the like.

Figure 8B:
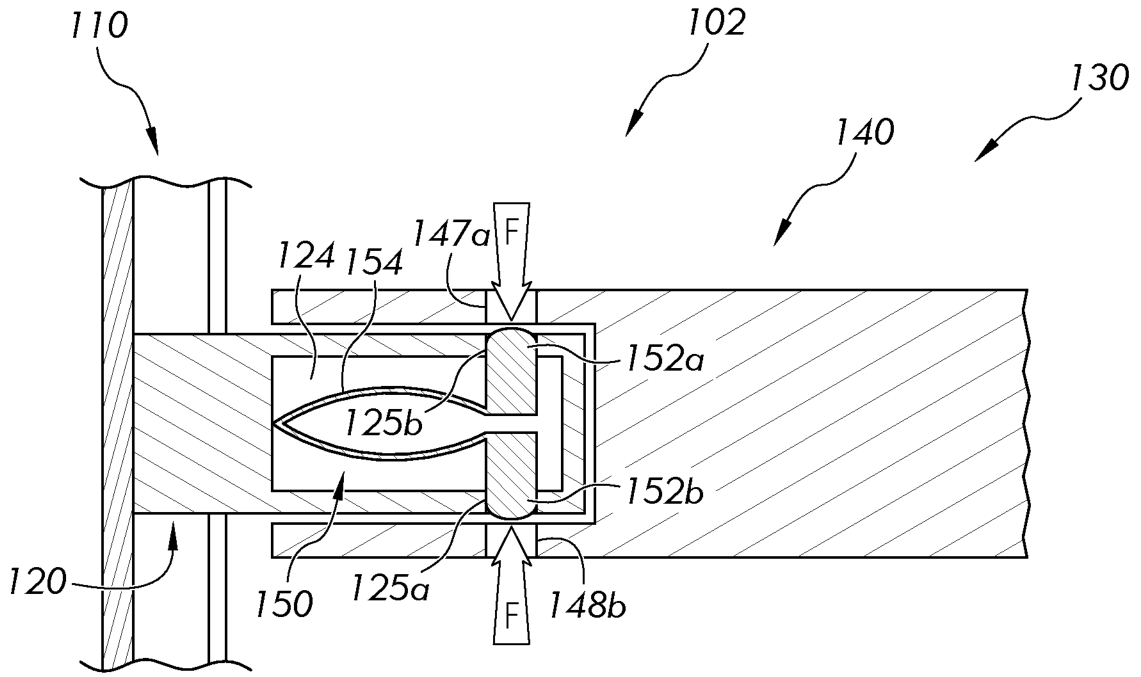
FIG. 8B schematically depicts application of force to decouple to crossbar from the attachment bracket of FIG. 8A, according to one or more embodiments shown and described herein.

In embodiments as depicted in FIGS. 8A and 8B, the support end 140 of the cross-rail 130 may include a first pin aperture 148*a* aligned with the first opening 125*a* and a second pin aperture 148*b* aligned with the second opening 125*b*. In these embodiments, when in the extended position, the first pin member 152*a* and the second pin member 152*b* may extend through the first pin aperture 148*a* and the second pin aperture 148*b* thereby locking the cross-rail 130 to the attachment bracket 120. It is noted that either end of the cross-rail 130 may be similarly attached to a respective attachment bracket 120. It should be understood that the spring-loaded pin 150 may be sufficient to couple the cross-rail 130 to the respective attachment bracket 120 without use of further additional tools thereby simplifying mounting and/or removal of the cross-rail 130 from the overhead rail system 100.

As noted herein the spring-loaded pin 150 is moveable between an extended position and a retracted position. For example, FIG. 8A depicts the example spring-loaded pin 150 in an extended position and FIG. 8B depicts the spring-loaded pin 150 moved to a retracted position. In particular, a user may apply a force, F, to the first pin member 152*a* and the second pin member 152*b* to cause the first pin member 152*a* and the second pin member 152*b* to retract into the body 121 of the attachment bracket 120 to the retracted position, as depicted in FIG. 8B. Once retracted, the support end 140 of the cross-rail 130 may be lifted or otherwise removed from engagement with the attachment bracket 120. Similarly during assembly of the cross-rail 130 to the attachment bracket 120, the first pin member 152*a* and the second pin member 152*b* may be moved to the retracted position to allow the support end 140 of the cross-rail 130 to be positioned on the extension portion 124 of the attachment bracket 120. The force on the spring-loaded pin 150 may be released to allow the first pin member 152*a* slide through the first opening 125*a* and into the first pin aperture 148*a* and the second pin member 152*b* to slide through the second opening 125*b* and into the second pin aperture 148*b*, thereby locking the cross-rail 130 to the attachment bracket 120.

It is noted that the attachment brackets 120 may be coupled to the cross-rail 130 before or after placement of the attachment portions 122 of the attachment brackets 120 within the bracket receiving recesses 112 of the mounting rails 110. Once positioned within the bracket receiving recesses 112 of the respective mounting rails 110, as depicted in FIG. 9, the overhead rail system 100 may be adjusted. For example, the cross-rail 130 and the attachment brackets 120 may be slid along the mounting rails 110 to a desired position in the +/−Y direction of the depicted coordinate axes. Accordingly, the position of the cross-rail 130 may be adjusted as desired based on a user's needs. Additionally, when the cross-rail 130 is not needed, it may be removed via operation of the spring-loaded pin 150 to release the cross-rail 130.

As noted above, the lift unit 20 (depicted in FIG. 1) may be mounted to the cross-rail 130. For example, the lift unit 20, depicted in FIG. 1, may be mounted to the cross-rail 130 before or after the cross-rail 130 is mounted to the mounting rails 110 and/or the attachment brackets 120. For example, the lift unit 20 may be mounted first to the cross-rail 130 and then the cross-rail 130 and the lift unit 20 may be collectively mounted to the attachment brackets 120 and/or the mounting rails 110. In other embodiments, it is contemplated that the lift unit 20 may be mounted to the cross-rail 130 after the cross-rail 130 is coupled to the attachment brackets 120 and/or the mounting rails 110. For example, spacing (not shown) may be provided within a support end 140*a*, 140*b* (for example) of the cross-rail 130 sized to allow insertion of the lift carriage 24 of the lift unit 20 into the lift unit support portion 132 of the cross-rail 130.

It should now be understood that embodiments of the present disclosure are directed to an overhead rail system which is mountable to the sidewalls of the room (as opposed to the ceiling) such that no portion of the overhead lift system need be attached to the ceiling. For example, embodiments of the present disclosure may include mounting assemblies which include a mounting rail, an attachment bracket, and a spring-loaded pin. The mounting assemblies may be used to affix a cross-rail to the sidewalls of a room such that the cross-rail extends across the room. Specifically, the mounting rail may be mounted to a sidewall of a room instead of the ceiling. The mounting rail includes a bracket receiving recess. The attachment bracket includes an attachment portion and an extension portion, wherein the attachment portion is shaped to correspond to the bracket receiving recesses such that the attachment portion is positionable within the bracket receiving recess The spring-loaded pin may be coupled to the attachment bracket and includes a retracted position and an extended position, wherein the spring-loaded pin is biased to the extended position to lock the cross-rail to the extension portion of the attachment bracket. Accordingly, the overhead rail system may be mounted to the sidewall of a room without need for ceiling supports. Additionally, the cross-rail may be mounted in place without need of additional tools (e.g., such as screw drivers, wrenches, etc.) thereby simplifying installation.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A mounting assembly for a cross-rail of an overhead rail system, the mounting assembly comprising:

a mounting rail configured to mount to a sidewall and comprising a bracket receiving recess;

an attachment bracket comprising an attachment portion and an extension portion, wherein the attachment portion is shaped to correspond to the bracket receiving recess such that the attachment portion is positionable within the bracket receiving recess; and a spring-loaded pin coupled to the attachment bracket and comprising a retracted position and an extended position, wherein the spring-loaded pin is biased to the extended position to lock a cross-rail of an overhead rail system to the extension portion of the attachment bracket;

wherein the mounting rail comprises:

a mounting base configured to be fixed to the sidewall;

a first retention flange extending from and along a first distal edge of the mounting base; and a second retention flange extending from and along a second distal edge of the mounting base, wherein the bracket receiving recess is partially enclosed by the mounting base, the first retention flange, and the second retention flange.

2. The mounting assembly of claim 1, wherein:
the attachment bracket comprises a body defining an interior chamber and one or more openings extending through the body to the interior chamber; and
the spring-loaded pin is positioned within the interior chamber and a portion of the spring-loaded pin is extendable and retractable through the one or more openings.

3. The mounting assembly of claim 1, wherein the spring-loaded pin comprises:
a first pin member extending in a first direction;
a second pin member extending in a second, opposite direction; and
a spring member coupling the first pin member to the second pin member.

4. The mounting assembly of claim 3, wherein:
the attachment bracket comprises:
a body;
an interior chamber positioned within the body;
a first opening extending through the body to the interior chamber, wherein the first pin member is slidably positioned within the first opening; and
a second opening extending through the body to the interior chamber, wherein the second pin member is slidably positioned within the second opening.

5. The mounting assembly of claim 4, wherein the first opening is positioned on a first side of the body and the second opening is positioned on a second, opposite side of the body.

6. The mounting assembly of claim 1, wherein the attachment bracket is longitudinally slidable within the bracket receiving recess of the mounting rail.

7. A mounting assembly for a cross-rail of an overhead rail system, the mounting assembly comprising:
a mounting rail configured to mount to a sidewall and comprising a bracket receiving recess comprising retention flanges;
an attachment bracket comprising an attachment portion and an extension portion, wherein the attachment portion is shaped to correspond to the bracket receiving recess of the mounting rail such that the attachment portion is positionable within the bracket receiving recess and the extension portion extends through a slot between the retention flanges; and
a spring-loaded pin coupled to the attachment bracket, the spring-loaded pin comprising a retracted position and an extended position, wherein the spring-loaded pin is biased to the extended position to lock a cross-rail of an overhead rail system to the extension portion of the attachment bracket;
wherein the spring-loaded pin comprises:
a first pin member extending in a first direction;
a second pin member extending in a second, opposite direction; and
a spring member coupling the first pin member to the second pin member.

8. The mounting assembly of claim 7, wherein:
the mounting rail comprises a mounting base configured to be engaged with and fixed to the sidewall via one or more fasteners; and
the retention flanges comprise:
a first retention flange extending from a first horizontal edge of the mounting base at a first oblique angle relative to the mounting base and defining a first retention surface; and
a second retention flange extending from a second horizontal edge of the mounting base at a second oblique angle relative to the mounting base and defining a second retention surface.

9. The mounting assembly of claim 7, wherein the attachment bracket is longitudinally slidable within the bracket receiving recess of the mounting rail.

10. The mounting assembly of claim 7, wherein the attachment bracket comprises:
a body;
an interior chamber positioned within the body;
a first opening extending through the body to the interior chamber, wherein the first pin member is slidably positioned within the first opening; and
a second opening extending through the body to the interior chamber, wherein the second pin member is slidably positioned within the second opening.

11. The mounting assembly of claim 10, wherein the first opening is positioned on a first side of the body and the second opening is positioned on a second, opposite side of the body.

12. An overhead rail system, comprising:
a first mounting assembly configured to be coupled to a first sidewall and a second mounting assembly configured to be coupled to a second sidewall, the first and second mounting assemblies each comprising:
a mounting rail configured to be mounted to a sidewall and comprising a bracket receiving recess;
an attachment bracket comprising an attachment portion and an extension portion, wherein the attachment portion is positioned within the bracket receiving recess; and
a spring-loaded pin coupled to the attachment bracket, the spring-loaded pin comprising a retracted position and an extended position, wherein the spring-loaded pin is biased to the extended position; and
a cross-rail configured to support a lift unit thereon, the cross-rail comprising a first support end removably coupled to the attachment bracket of the first mounting assembly via the spring-loaded pin of the first mounting assembly and a second support end removably coupled to the attachment bracket of the second mounting assembly via the spring-loaded pin of the second mounting assembly;
wherein the mounting rail comprises:
a mounting base configured to be fixed to the sidewall;
a first retention flange extending from a first edge of the mounting base at a first oblique angle relative to the mounting base and defining a first retention surface; and
a second retention flange extending from a second edge of the mounting base at a second oblique angle relative to the mounting base and defining a second retention surface.

13. The overhead rail system of claim 12, wherein the first and second support ends of the cross-rail comprise:
a top surface;
a bottom surface opposite the top surface;
a mounting recess extending through the bottom surface toward and spaced from the top surface, such that the top surface overlies the extension portion of the attachment bracket when positioned thereon.

14. The overhead rail system of claim 13, wherein the cross-rail comprises first and second side surfaces extending between the top surface and the bottom surface, wherein at least one of the first and second side surfaces comprise a pin aperture for receiving the spring-loaded pin.

15. The overhead rail system of claim 12, wherein the first retention flange and the second retention flange extend from the mounting base toward one another.

16. The overhead rail system of claim 15, wherein the attachment portion of the attachment bracket of the first and second mounting assemblies is positioned within the bracket receiving recess and engages the first retention flange and the second retention flange, and the extension portion extends through a slot between the first retention flange and the second retention flange.

17. The overhead rail system of claim 12, wherein:

each attachment bracket comprises a body defining an interior chamber and one or more openings extending through the body to the interior chamber; and each spring-loaded pin is positioned within the interior chamber and a portion of the spring-loaded pin is extendable and retractable through the one or more openings.

* * * * *